US009133041B2

(12) United States Patent
Douglas

(10) Patent No.: US 9,133,041 B2
(45) Date of Patent: *Sep. 15, 2015

(54) REMEDIATION OF GROUNDWATER

(75) Inventor: Grant Brian Douglas, Parkerville (AU)

(73) Assignee: Commonwealth Scientific and Industrial Research Organisation, Campbell, Australian Capital Territory (AU)

( * ) Notice: Subject to any disclaimer, the term of this patent is extended or adjusted under 35 U.S.C. 154(b) by 1075 days.

This patent is subject to a terminal disclaimer.

(21) Appl. No.: 12/295,975

(22) PCT Filed: Apr. 4, 2007

(86) PCT No.: PCT/AU2007/000452
§ 371 (c)(1),
(2), (4) Date: Jan. 30, 2009

(87) PCT Pub. No.: WO2007/112509
PCT Pub. Date: Oct. 11, 2007

(65) Prior Publication Data
US 2009/0184058 A1  Jul. 23, 2009

(30) Foreign Application Priority Data

Apr. 6, 2006  (AU) .................................. 200601789

(51) Int. Cl.
| | | |
|---|---|---|
| B01D 21/00 | (2006.01) | |
| C02F 1/52 | (2006.01) | |
| B01D 21/01 | (2006.01) | |
| B03D 3/00 | (2006.01) | |
| C02F 1/66 | (2006.01) | |
| B09C 1/00 | (2006.01) | |
| E21B 43/28 | (2006.01) | |
| E21C 41/16 | (2006.01) | |
| C02F 1/00 | (2006.01) | |
| C02F 101/20 | (2006.01) | |
| C02F 103/06 | (2006.01) | |

(52) U.S. Cl.
CPC . *C02F 1/66* (2013.01); *B09C 1/002* (2013.01); *C02F 2101/20* (2013.01); *C02F 2103/06* (2013.01)

(58) Field of Classification Search
USPC ......................................................... 210/702
See application file for complete search history.

(56) References Cited

U.S. PATENT DOCUMENTS

| | | | | | |
|---|---|---|---|---|---|
| 3,094,846 | A | * | 6/1963 | Peeler, Jr. ......................... | 422/1 |
| 3,539,306 | A | | 11/1970 | Kumura et al. | |
| 3,971,222 | A | * | 7/1976 | Griffith, Jr. .................... | 405/263 |
| 4,054,320 | A | * | 10/1977 | Learmont ......................... | 299/4 |
| 4,233,015 | A | * | 11/1980 | Teague et al. ................. | 405/263 |
| 4,664,809 | A | * | 5/1987 | Fenton et al. ................. | 210/663 |
| 4,871,283 | A | * | 10/1989 | Wright ......................... | 405/263 |
| 4,904,457 | A | | 2/1990 | Misra | |
| 4,935,146 | A | * | 6/1990 | O'Neill et al. ................. | 210/684 |
| 5,114,898 | A | | 5/1992 | Pinnavaia et al. | |
| 5,202,033 | A | * | 4/1993 | Stanforth et al. .......... | 405/128.5 |
| 5,263,795 | A | * | 11/1993 | Corey et al. .............. | 405/128.25 |
| 5,728,302 | A | * | 3/1998 | Connor et al. ................. | 210/679 |
| 5,945,003 | A | * | 8/1999 | Strauel .......................... | 210/688 |
| 6,139,753 | A | * | 10/2000 | Taylor .......................... | 210/717 |
| 6,932,909 | B2 | | 8/2005 | Rey | |
| 7,077,963 | B2 | * | 7/2006 | McConchie et al. .......... | 210/667 |
| 2003/0006195 | A1 | | 1/2003 | Fuda et al. | |
| 2004/0040912 | A1 | | 3/2004 | McConchie et al. | |
| 2009/0305885 | A1 | | 12/2009 | Yamada et al. | |

FOREIGN PATENT DOCUMENTS

| | | |
|---|---|---|
| CN | 1569671 | 1/2005 |
| WO | WO 93/22237 A1 | 11/1993 |
| WO | WO 02/36497 A1 | 5/2002 |

OTHER PUBLICATIONS

Christian et al. "Interaction of Synthetic Sulphate "Green Rust" with Phosphate and the Crystallization of Vivianite". 1999. Clays and Clay Minerals. vol. 47. No. 3. pp. 312-318.*
Christian, et al. "Interaction of Synthetic Sulphate "Green Rust" with Phosphate and the Crystallization of Vivianite", Clay and Clay Minerals, 1999, 47,312-318.*
PCT International Search Report PCT/AU2007/000452 Dated May 4, 2007.
Derwent Abstract Accession No. 98-499830/43, Class D15 JP 10216742 A (Kawaken Fine Chem Co Ltd) Aug. 18, 1998.
Australian and New Zealand Environment and Conservation Council and Agriculture and Resource Management Council of Australia and New Zealand, "An Introduction to the Australian and New Zealand Guidelines for Fresh and Marine Water Quality," 4A, Oct. 2000, 349 pages.
Cortina, J., Lagreca, I., De Pablo, J., "Passive in situ remediation of metal-polluted water with caustic magnesia—evidence from column experiments," Environ.Sci. Technol. 2003, 37, 1971-1977.
Feitknecht, W von, "Uber die Bildung von Doppelhydroxen zwischewn zweiund dreiwertigen Metallen," Helv. Chim. Acta, 1942, 25, 555-569.
Frondel, C., "Constitution and polymorphism of the pyroauritic and sjogrenite Groups," Amer. Mineral., 26, 1941, 295-306.
Hansen, H.C.B., (2004). Green rusts and reduction of pollutants. In: Biogeochimie du cycle du fer Rouilles vertes et fougerite. Institute de France, Academie des Sciences, Dec. 10, 2004.

(Continued)

*Primary Examiner* — Nam Nguyen
*Assistant Examiner* — Clare Perrin
(74) *Attorney, Agent, or Firm* — Brinks Gilson & Lione

(57) ABSTRACT

A groundwater remediation method for treating acidic or alkaline groundwater containing divalent and trivalent metal cations includes the step of injecting a slurry or suspension of solid alkaline material into the ground, the slurry or suspension being injected into one or more regions such that the groundwater contacts the solid alkaline material and the divalent and trivalent metal cations react to form a layered double hydroxide (LDH) material.

19 Claims, No Drawings

(56) References Cited

OTHER PUBLICATIONS

Hsi, C.K.D. and Langmuir, D. (1985). Adsorption of uranyl onto ferric oxyhydroxides: Application of surface complexation site binding model. Geochim. et Cosrnochim. Acta, 49, 2423-2432.

Kameda, T., Yabuuchi, F., Yoshioka, T., Uchida, M. and Okuwaki, A., (2003). New method of treating dilute mineral acids using magnesium-aluminum oxide. Wat. Res., 37, 1545-1550.

Kameda, T., Yoshioka, T., Mitsuhashi, T., Uchida, M. and Okuwaki, A., (2003). The simultaneous removal of calcium and chloride ions from calcium chloride solution using magnesium-aluminum oxide, Wat. Res., 37, 4045-4050.

Parkhurst, D.L. et al., "Users guide to PHREEQC (Version 2)—A computer program for speciation, batch-reaction, one-dimensional transport, and inverse geochemical calculations," Water Resources Investigations Report 99-4259, US Geological Survey, 1999, 326 pages.

Sato, T., Wakabayashi, T. and Shimada, M., (1986). Adsorption of various anions by magnesium aluminium oxide. Ind. Eng. Chem. Prod. Res., 25, 89-92.

Taylor, R.M. and McKenzie, R.M., (1980). The influence of aluminium and iron oxides VI. The formation of Fe(II)—Al(III) hydroxy-chlorides, -sulphates, and carbonates as new members of the pyroaurite group and their significance in soils. Clay and Clay Min. 28, 179-187.

Albiston, L., Franklin, K.R, Lee, E. and Smeulders, J.B.A.F., (1996). Rheology and microstructure of aqueous layered double hydroxide dispersions. *J. Mater. Chem.*, 6, 871-877.

Amin, S. and Jayson, G. G., (1996). Humic substance uptake by hydrotalcites and PILCS. *Wat, Res.*, 30, 299-306.

Boclair, J.W and Braterman, P.S., (1999). Layered double hydroxide stability. 1. Relative stabilities of layered double hydroxides and their simple counterparts. *Chem. Mater.* 11, 298-302.

Bourrie, G., Trolard, F., Refait, P. and Feder, F., (2002). A solid solution model for Fe—$^{II}$Fe$^{III}$—Mg green rust (fougerite) : structural and geochemical constraints. *17th WCSS*, Aug. 14-17, 2002, Thailand, Paper No. 1653, 19pp.

Cavani, F., Trifiro, F and Vaccari, A., (1991). Hydrotalcite-type anionic clays: preparation, properties and applications. *Catalysis Today*, 11, 173-301.

Depege, C., El Metoui, F.-Z., Forano, c., de Roy, A., Dupuis, 1. and Besse, J-P., (1996). Polymerization of silicates in layered double hydroxides. *Chem. Mater.*, 8, 952-960.

Ford, R G., Scheinost, A. C, Schekel, K. G. and Sparks, D, L., (1999) The link between clay mineral weathering and the stabilization of Ni surface precipitates. *Environ. Sci. Techno*, 33, 3140-3144.

Genin, J.-M.R., Refait, P., Bourrie, G., Abdelmoula, M. and Trolard, F., (2001). Structure and stability of the Fe(II)—Fe(III) green rust "fougerite" mineral and its potential for reducing pollutants in soil solutions. *Appl. Geochem.*, 16, 559-570.

Misra, C. and Perrotta, A. 1., (1992). Composition and properties of synthetic hydrotalcites. *Clay and Clay Min.*, 40, 145-150.

Miyata, S., (1980). Physico-chemical properties of synthetic hydrotalcites in relation to composition. *Clay and Clay Min.*, 28, 50-56.

Miyata, S., (1983). Anion-exchange properties of hydrotalcite-like compounds. *Clay and Clay Min.*, 31, 305-31 1.

O'Loughlin, E.J., Kelly, S.D., Cook, RE., Csencsits, R. and Kemner, K.M., (2003). Reduction of uranium (VI) by mixed Fe(II)/Fe(III) hydroxide (Green rust): Formation of $UO_2$ nanoparticles. *Environ. Sci. Technol.*, 37, 721-727.

Ookubo, A., Ooi, K. and Hayashi, H., (1993). Preparation and phosphate ion-exchange properties of a hydrotalcitc-like compound. *Langmuir*, 9, 141 8-1422.

Reardon, E. I and Della Valle, S., (1997), Anion sequestering by the formation of anionic clays: lime treatment of fly ash slurries. *Environ. Sci. Techno!.*, 3 1, 12 18-1223.

Roh, Y, Lee, S.Y, Elles, M.P. Foss, J.E., (2000). Incorporation of radioactive contaminants into pyroaurite-like phases by electrochemical synthesis. *Clay and Clay Miner.*, 48, 266-271.

Seida, Y. and Nakano, Y, (2000). Removal of humic substances by layered double hydroxide containing iron. *Wat. Res.*, 34, 1487-1494.

Seida, Y and Nakano, Y, (2002). Removal of phosphate by layered double hydroxides containing iron. *Wat. Res.*, 36, 1306-13 12.

Shin, H-S., Kim, M-J., Nam, S-Y and Moon, H-C., (1996). Phosphorus removal by hydrotalcite compounds (HTLcs). *Wat. Sci. Tech.*, 34, 161-168.

Taylor, R.M. (1984). The rapid formation of crystalline double hydroxy salts and other compounds by controlled hydrolysis. *Clay Min.*, 19, 591-603.

Thornber, M. R. and Hughes, C.A., (1987). The mineralogical and chemical properties of red mud waste from the Western Australian alumina industry. In Wagh, A. S. and Desai, P (Ed.), Proc. Int. Conf. Bauxite Tailings, Kingston, Jamaica. 1-19.

Vucelic, M., Jones, W. and Moggridge, G.D., (1997). Cation ordering in synthetic layered double hydroxides. *Clays and Clay Min.*, 45, 803-813.

European Search Report and Written Opinion dated Sep. 30, 2013 for corresponding European Application No. 07718699.7, 14 pages.

Aissa, R., Ruby, C.., Gehin, A., Abdelmoula, M., and Genin, J.-M. R., "Synthesis by Coprecipitation of Al-Substituted Hydroxysulphate Green Rust $Fe^{II}_4 Fe^{III}_{(2-y)} Al^{III}_y (OH)_{12} SO_4, nH_2O$," Hyperfine Interactions, 2004, vol. 156/157, pp. 445-451.

Bas, A.D., Yaici, E. Y., Deveci, H., "Recovery of silver from X-ray film processing effluents by hydrogen peroxide treatment," Hydrometallurgy, 2012, vol. 121-124, pp. 22-27.

Taylor, R.M. and McKenzie, R.M., "The influence of aluminium and iron oxides VI. The formation of Fe(II)—Al(III) hydroxy-chlorides, -sulphates, and carbonates as new members of the pyroaurite group and their significance in soils," Clay and Clay Minerals, 1980, vol. 28, No. 3, pp. 179-187.

\* cited by examiner

REMEDIATION OF GROUNDWATER

FIELD OF THE INVENTION

The present invention relates to a method for remediation of groundwater. In another aspect, the present invention relates to a method for management of in situ leaching of an ore body or to a heap leaching method or to stabilization of an ore body or waste material.

BACKGROUND OF THE INVENTION

Acidic or alkaline groundwater or porewater, in natural settings or man-made wastes or operations, may be derived from a multitude of sources. Examples of these sources may include:
- Oxidation of sulphide-containing soils to form acid sulphate soils (ASS) by natural processes (e.g. seasonal changes in groundwater level and/or oxygen status) or disturbance (e.g. during construction or excavation)
- Industrial processes (e.g. pyrite oxidation, sulphuric acid production) with offsite loss via soil/groundwater infiltration
- Discharge, escape and infiltration of acidic or alkaline surface waters from mining or extractive metallurgical operations
- In-situ leaching of orebodies (e.g. uranium or copper ores)
- Fluids derived from mineral processing (e.g. alkaline red mud via the Bayer process).

As a consequence of the processes that lead to the formation of these waters, such waters may often be enriched in a variety of metals, metalloids and anions, the concentrations of which may exceed both ANZECC Soil and Water Quality guidelines (ANZECC/NHMRC, 1992).

A challenge exists to identify methods for remediation of the acidic and alkaline groundwater that are both cost-effective and environmentally robust with safe and efficient immobilization (and if appropriate, off-site disposal) of the contaminants after neutralization. Effective long-term management of acidic and alkaline groundwaters is also required to meet regulatory requirements.

Layered double hydroxides (LDH) are a class of both naturally occurring and synthetically produced materials characterised by a positively-charged mixed metal hydroxide layers separated by interlayers that contain water molecules and a variety of exchangeable anions. Layered double hydroxides most commonly formed by the coprecipitation of divalent (e.g. $Mg^{2+}$, $Fe^{2+}$) and trivalent (e.g. $Al^{3+}$, $Fe^{3+}$) metal cation solutions at moderate to high pH (Taylor, 1984, Vucelic et al, 1997, Shin et al, 1996).

Layered double hydroxide compounds may be represented by the general formula (1):

$$M_{(1-x)}^{2+}M_x^{3+}(OH)_2A^{n-}{}_yH_2O \qquad (1)$$

where $M^{2+}$ and $M^{3+}$ are divalent and trivalent metal ions, respectively and $A^{n-}$ is the interlayer ion of valence n. The x value represents the proportion of trivalent metal ion to the proportion of total amount metal ion and y denotes variable amounts of interlayer water.

Common forms of layered double hydroxides comprise $Mg^{2+}$ and $Al^{3+}$ (commonly known as hydrotalcites) and $Mg^{2+}$ and $Fe^{3+}$ (known as pyroaurites), but other cations, including Ni, Zn, Mn, Ca, Cr and La, are known. The amount of surface positive charge generated is dependant upon the mole ratio of the metal ions in the lattice structure and the conditions of preparation as they affect crystal formation.

The formation of hydrotalcite (the most commonly synthesised LDH with carbonate as the principal "exchangeable" anion) may be most simply described by the following reaction:

$$6MgCl_2 + 2AlCl_3 + 16NaOH + H_2CO_3 \rightarrow Mg_6Al_2(OH)_{16}CO_3 \cdot nH_2O + 2HCl$$

Typically, ratios of divalent to trivalent cations in hydrotalcites vary from 2:1 to 3:1. Other synthetic pathways to form hydrotalcite (and other LDH) include synthesis from $Mg(OH)_2$ (brucite) and MgO (calcined magnesia) via neutralisation of acidic solutions (eg. Albiston et al, 1996). This can be described by the following reaction:

$$6Mg(OH)_2 + 2Al(OH)_3 + 2H_2SO_4 \rightarrow Mg_6Al_2(OH)_{16}SO_4 \cdot nH_2O + 2H_2O$$

A range of metals of widely varying concentrations may also be simultaneously coprecipitated, hence forming a polymetallic LDH. Hydrotalcites or LDH were first described over 60 years ago (Frondel, 1941, Feitknecht, 1942). Sometimes, they can also occur in nature as accessory minerals in soils and sediments (eg. Taylor and McKenzie, 1980). Layered double hydroxides may also be synthesised from industrial waste materials by the reaction of bauxite residue derived from alumina extraction (red mud) with seawater (eg. Thornber and Hughes, 1987), as described by the following reaction:

$$6Mg(OH)_2 + 2Al(OH)_3 + 2Na_2CO_3 \rightarrow Mg_6Al_2(OH)_{16}CO_3 \cdot nH_2O + 2NaOH$$

or by the reaction of lime with fly ash derived from fossil fuel (eg. coal fired power stations, Reardon and Della Valle, 1997).

Within the LDH a structure there are octahedral metal hydroxide sheets that carry a net positive charge due to limited substitution of trivalent for divalent cations as described above. As a consequence, it is possible to substitute a wide range of inorganic or organic anions into the LDH structure. These anions are often referred to as "interlayer anions" as they fit between the layers of hydroxide material. Layered double hydroxides are generally unstable below a pH of approximately 5 (Ookubu et al, 1993) but may act as buffers over a wide range of solution pH (Seida and Nakano, 2002). Layered double hydroxides, and in particular those that contain carbonate as the predominant anion have also been demonstrated to have a considerable capacity to neutralise a range of mineral acids via consumption of both the hydroxyl and carbonate anions contained within the LDH structure (eg. Kameda et al, 2003).

A number of studies have been conducted to investigate ways to exploit the anion exchange properties of LDH. These studies have focussed on the removal of phosphate and other oxyanions and humic substances from natural and wastewaters (Miyata, 1980, Misra and Perrotta, 1992, Amin and Jayson, 1996, Shin et al, 1996, Seida and Nakano, 2000). Phosphate is one of the many anions that may be exchanged into the interlayer space in LDH. Laboratory studies of phosphate uptake using synthetically prepared Mg—Al hydrotalcites and a range of initial dissolved phosphate concentrations indicate an uptake capacity of from ca. 25-30 mg P/g (Miyata, 1983, Shin et al, 1996) to ca. 60 mg P/g with uptake also influenced by initial phosphate concentration, pH (with maximum phosphate absorption near pH 7), degree of crystallinity and the hydrotalcite chemistry (Ookubo et al, 1993). A major obstacle to the use of hydrotalcites for phosphate removal in natural and/or wastewaters is the selectivity for carbonate over phosphate, with a selectivity series in the approximate order $CO_3^{2-} > HPO_4^{2-} >> SO_4^{2-}$, $OH^- > F^- > Cl^- > NO_3^-$ (Miyata, 1980, 1983, Sato et al, 1986, Shin et al, 1986, Cavani et al, 1991). Many hydrotalcites are also synthesised with carbonate as the predominant anion and thus require anion exchange before they are exposed to phosphate. When carbonate is also combined with sulphate, nitrate and chloride (as might commonly occur in natural or wastewaters) the reduction of phosphate absorption to the hydrotalcite is further decreased (Shin et al, 1996).

A number of recent studies have focussed on the formation and study of synthetic LDH and their subsequent reactivity to a range of anions, particularly silicate (e.g. Depege et al, 1996) with a view to forming polymetallic aluminosilicates, which as potential precursors to clay materials, are thought to limit metal mobility and bioavailability (eg. Ford et al, 1999). A potential also exists for the co-precipitation of silicate and aluminate anions and another precursor of analogue of clay minerals.

Calcined magnesia (MgO) or its derivative, magnesium hydroxide ($Mg(OH)_2$), possess considerable advantages over other alkalis such as slaked lime ($Ca(OH)_2$) in the neutralisation of acids or acidic wastes[1].

One of the most important advantages is the relatively small amount of calcined magnesia (MgO) magnesium hydroxide ($Mg(OH)_2$) that is required. For the neutralisation of 1 tonne of 98% sulphuric acid, only 424 kg of 96% solid MgO, 613 kg of 96% solid $Mg(OH)_2$ or 1005 kg of a 58% slurry of $Mg(OH)_2$ are required. In comparison, almost 1600 kg of a 50% NaOH solution, 1645 kg of a 45% solution of $Ca(OH)_2$, 3210 kg of a 33% slurry of $Na_2CO_3$ or 975 kg of $CaCO_3$ are required to achieve neutralization of 1 tonne of 98% sulphuric acid.

The chemistry of calcined magnesia also confers a number of distinct advantages. Alkalis such as caustic soda or lime can be considered to neutralise by a one-step dissociation reaction that results in the formation of hydroxyl ions and an increase in the solution pH. In contrast, the neutralisation of acidic solutions by calcined magnesia can be considered to be a two-step reaction as magnesium hydroxide, the intermediate product in the neutralisation process is only slightly soluble in water. As a consequence neutralisation occurs as soluble hydroxide ions derived from magnesium hydroxide are consumed by the acid. Using sulphuric acid as the acid source, the neutralisation reactions can be summarised as follows:

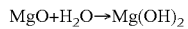
$$MgO + H_2O \rightarrow Mg(OH)_2$$

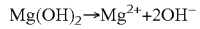
$$Mg(OH)_2 \rightarrow Mg^{2+} + 2OH^-$$

$$H_2SO_4 + Mg^{2+} + 2OH^- \rightarrow MgSO_4 + 2H_2O$$

As a consequence of the production of hydroxide ions from the slightly soluble magnesium hydroxide, the neutralisation reaction occurs rapidly at low pH and slows appreciably as the pH increases. In addition, varying mineral grainsize can change the reactivity of MgO. In contrast, the neutralisation rate of lime and similar products do not vary appreciably as a function of pH. It is the slower reaction rate of calcined magnesia that results in the formation of denser slurries (eg. of mineral precipitates) relative to lime, thus reducing handling and disposal costs. In addition, the positive charge on magnesium-based alkalis at neutral to marginally alkaline pH attracts negatively charged particles (eg. humic substances, some colloids) often facilitating superior filtration of high-solids sludges.

Calcined magnesia is also appreciably safer to handle than a range of other alkalis such as caustic soda. Magnesia-based alkalis are virtually non-corrosive, only weakly exothermic and reactive and hence easy to handle, thus reducing safety concerns. These features contrast strongly with lime and other alkalis. An additional feature of calcined magnesia is the potential for the efficient (and often simultaneous) removal of a range of metals. The removal efficiency is related to the presence of a high pH immediately adjacent to the particle surface. This high pH zone can provide an ideal zone for the precipitation of metal hydroxides which may cement onto the surface of calcined magnesia substrate. Calcined magnesia has also been used in the simultaneous removal of ammonia and phosphate (principally in sewage) via the precipitation of struvite ($MgNH_4PO_4$).

Calcined magnesia also has a number of potential advantages relative to other remedial strategies such as sulphate reduction, the application of calcite and/or lime in removing metals and other ions from groundwater. Comparatively, sulphate reduction is a slow process with a long residence time often required (ca. weeks) for effective reduction of metal concentrations to take place. Hence, an unrealistically thick barrier may be required, particularly in areas where there is a high groundwater gradient or flow velocity, the latter perhaps due to groundwater extraction. Where organic matter and/or calcite are used for treatment applications the residual pH of ca. 6 after treatment while allowing the removal of trivalent metals as hydroxides is insufficient to allow the precipitation of many divalent metals ions which require a higher pH. In the case of lime, even moderate over application may result in a residual pH of ca. 12 resulting in a range of deleterious effects including to endemic micro- and macro-biota, with possible re-neutralisation of any discharged water required, particularly in sensitive environmental areas (see, for example, Cortina et al, 2003).

The applicant does not concede that the prior art discussed herein forms part of the common general knowledge.

BRIEF DESCRIPTION OF THE INVENTION

In a first aspect, the present invention provides a groundwater remediation method for treating acidic or alkaline groundwater containing divalent or trivalent metal cations, the method including the step of injecting a slurry or suspension of solid alkaline material into the ground, said slurry or suspension being injected into one or more regions such that the groundwater contacts the solid alkaline material and the divalent and trivalent metal cations react to form a layered double hydroxide (LDH) material.

The groundwater may contain divalent and trivalent metal cations.

Although the methods of all aspects of the present invention may be used in acidic environments and alkaline environments, the present invention is likely to find greater application in use in acidic environments.

The solid alkaline material may be, for example, lime, calcium hydroxide, magnesia or magnesium hydroxide or a combination of two or more of the above or other alkaline materials or amendments as required. Preferably, the solid alkaline material is magnesia or magnesium hydroxide or a combination thereof. Other reagents such as, but not limited to, aluminate and/or silicate anions may also be added with the magnesia or magnesium hydroxide to achieve the desired system geochemistry The magnesia is suitably a reactive magnesia or a caustic magnesia, such as obtained by calcining magnesite to temperatures from 700-1000° C. Such magnesia is commonly called calcined magnesia or caustic magnesia. Preferably, the slurry or suspension comprises a colloidal slurry of calcined magnesia or magnesium hydroxide or a mixture thereof.

For convenience and brevity, hereinafter in this specification the term "slurry" will be used to refer to a slurry or a suspension. The slurry may be made by mixing calcined magnesia or magnesium hydroxide and any other reagents as required with water. The slurry may be made by mixing calcined magnesia or magnesium hydroxide having a particle size ranging from a few millimeters down to colloidal or sub-colloidal sizes, or mixtures thereof, and with mixtures of other reagents as required thereof with water. The slurry may be made prior to injection or it may be made by mixing the calcined magnesia or magnesium hydroxide, optionally with mixtures of other reagents as required, with water as the water is being injected into the ground, waste stream, or mineral waste or processing residue.

The one or more regions where the slurry is injected into the ground may be any region where the contaminated groundwater/porewater is likely to flow. The one or more regions may be selected from one or more of the following:

1. directly into an aquifer having acidic groundwater therein;
2. down gradient of a plume of acidic groundwater (i.e. in the expected flow path of the acidic groundwater);
3. around a plume acidic groundwater;
4. under a plume of acidic groundwater; or
5. above a plume of acidic groundwater (e.g. in the case of a seasonally rising water table or a hydrological disturbance leading to a local or regional rise in the groundwater level).

All of the above examples of injection also apply to alkaline groundwaters or porewaters such as those contained in red mud or other mining or mineral processing residues.

The slurry may be injected at a single injection point or it may be injected at a plurality of injection points.

The method of the first aspect of the present invention has a number of advantages over prior art groundwater remediation methods, which typically involved forming a physical and chemical barrier to the flow of acidic or alkaline groundwater by excavating a trench or hole in the ground and filling the hole or trench with solid alkaline material such as lime. The solid alkaline material that is added to the hole or trench may be covered with soil that was displaced during excavation of the hole or trench. The solid alkaline material added to the trench or hole may require mixing with soil, sand or other medium and/or be contained within a semipermeable membrane of a variety of natural and/or synthetic compositions to achieve a suitable porosity and/or permeability, thus increasing site and material handling costs. In contrast to such prior art methods, the method of the present invention does not require excavation, which limits environmental disturbance or damage and minimises aesthetic impact. Further, large excavation can be time consuming and expensive. This is largely obviated by the present invention. Indeed, in preferred embodiments of the present invention, the slurry is injected into the ground by drilling a hole or bore and injecting the slurry through the hole or bore. Suitably, the depth(s) of injection and/or rates of penetration of the magnesia or magnesium hydroxide and other reagents can be controlled by the presence of slots or orifices in the bore casing. Rates of penetration into the aquifer (and hence rate of neutralization) may also be influenced by the pressure of injection during pumping and other factors such as the composition and/or solids concentration of the slurry.

The slurry that is injected into the ground in the present invention can be injected by using pumping or by creating a local head from a reservoir located above the point of injection. This is considerably easier than the solids handling solutions that were required in the prior art ground remediation methods. In this regard, it will be understood that it is easier to handle and inject a slurry than to handle and move solid materials during excavation and filling of a trench or hole.

A further advantage accrues by virtue of the slurry of magnesia or magnesium hydroxide (and other reagents as required) being able to move through a greater distance in the ground or aquifer than in prior art methods, where the solid alkaline material was constrained to remain within the hole or trench it was originally placed in. As a result, a larger dispersion of magnesia or magnesium hydroxide can be obtained, meaning that potentially a larger body of acidic or alkaline groundwater can be treated. Alternatively, the colloidal magnesia or magnesium hydroxide (and other reagents as required) may be transported within the plume from the point of injection, particularly where the plume has been largely neutralized.

It is also possible to add other components (for example, reagents such as silicate and/or aluminate) to the slurry in order to improve the remediation of the groundwater. Similarly, it is possible to add other components to the ground either before or after the slurry and still get good dispersion of the other components relative to the magnesia or magnesium hydroxide. In this regard, the other components may be injected into the ground in the form of a solution or as a slurry. Satisfactory mixing of the magnesia or magnesium hydroxide relative to or with the other components can then be achieved by virtue of the superior dispersion of magnesia and magnesium hydroxide available by virtue of its injection into the ground in the form of a slurry. In contrast, in prior art methods, any solid components to be mixed with the solid alkaline material had to be mixed prior to adding the solid alkaline material to the ground if good intermixing between the components and the solid alkaline material was to be achieved.

The method of the first aspect of the present invention results in the in situ formation of layered double hydroxide materials. These materials are solids. These materials are generally stable at circumneutral to alkaline pH (usually pH>5). Thus, formation of the layered double hydroxide materials removes metal cations from the groundwater. Advantageously, the layered double hydroxide materials also include exchangeable anions in their interlayer spaces, which anions may ion exchange with other deleterious anions in the groundwater, such as arsenic containing anions and phosphorus containing anions. This further remediates the groundwater.

The layered double hydroxide formed may be hydrotalcite. In other embodiments, the layered double hydroxide that is formed may include pyroaurite. In other embodiments, the layered double hydroxide may include green rust (e.g. "fougerite"), a layered double hydroxide having the general formula:

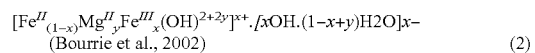
(Bourrie et al., 2002)      (2)

The present inventors believe that the formation of green rust in the present invention is the first example of green rust being formed by using calcined magnesia or magnesium hydroxide without the presence of carbonate or bicarbonate salts. Some benefits flowing from that are explained in more detail in Example 4.

It is to be understood that the formation of other layered double hydroxide materials and the formation of a mixture of layered double hydroxide materials are encompassed by the present invention.

Although the layered double hydroxide material formed in situ is stable at alkaline pH, if the plume of acidic groundwater is very large or is replenished (for example, by further acid contamination of the groundwater), there is a risk that the magnesia or the magnesium hydroxide injected into the ground could become depleted. If this occurs, the pH could decrease to a level where the layered double hydroxide material could dissolve, thereby again liberating the metal cations. To avoid this, an overdose of slurry (excess to that required for neutralization of acidity and/or formation of a layered double hydroxide) could be used. Alternatively or additionally, further injection of a slurry of calcined magnesia or magnesium hydroxide (and other reagents as required) could be carried out. Indeed, the present invention envisages, in some embodiments, repeated or periodic injections of the slurry. Alternatively, further components could be injected into the one or more regions, which further act to stabilise the layered double hydroxide material.

In one embodiment, the further component is a component containing buffering anions. The component may, for example, include carbonate anions, such as sodium carbonate or sodium bicarbonate to assist in buffering acidity, oxymetallic anions such as permanganate to assist in buffering changes in redox potential or complexed anions or organometallic anions which may otherwise react to form secondary species within or in addition to the layered double hydroxide. With these components, when the layered double hydroxide material is formed in the ground, the buffering anions are taken up by ion exchange for incorporation into the interlayer space of the layered double hydroxide material. If further acid groundwater flows past the layered double hydroxide material, the interlayer anions act as a buffer to minimise any pH changes, thereby reducing the likelihood of solution of the layered double hydroxide material. It will be appreciated that if the buffering capacity is exceeded, further injection of the slurry of magnesia or magnesium hydroxide may be required.

In another embodiment, the further component is a component containing one or more moieties that takes place in the reaction to form the layered double hydroxide material, with the one or more moieties being incorporated into the layered double hydroxide material matrix or crystal structure. For example, the further component may contain a silicate moiety, which is taken up into the matrix or crystal structure of the layered double hydroxide material to thereby form a more stable layered double hydroxide material. Silicate provides stability as with this anion in place, the layered double hydroxide material begins to resemble a clay material. A number of other moieties either by themselves or in combination (e.g. silicate and aluminate) may also be used to stabilise the layered double hydroxide material or modify the solution chemistry prior to layered double hydroxide formation to yield the desired composition. For example, the interlayer anions may be tailored to provide stability against, say, reductive dissolution if for instance the trivalent cation in the layered double hydroxide material was $Fe^{3+}$ and reduction to $Fe^{2+}$ would lead to a loss of interlayer charge.

The moiety may also include nitrate anions (as a source of N where N may be limiting in a biological process taking place in the aquifer) or sulphate anions where sulphate reduction constitutes a concurrent or additional remediation step. The moiety may also include phosphate ions (as a source of P where P may be limiting in a biological process taking place in the aquifer).

The further component (e.g. reagents such as silicate and/or aluminate) could be injected prior to injection of the calcined magnesia or magnesium hydroxide. Alternatively, the further component could be injected with the slurry of the calcined magnesia or magnesium hydroxide, or the further component could be injected after injection of the calcined magnesia or magnesium hydroxide.

In a second aspect, the present invention provides a groundwater remediation method for treating acidic or alkaline groundwater containing divalent and trivalent metal cations including the steps of placing a solid alkaline material into one or more regions where the solid alkaline material contacts the groundwater and also placing a component containing one or more buffering anions into the one or more regions, wherein whenever the groundwater contacts the solid alkaline material in the one or more regions, layered double hydroxide material forms and the buffering anion is taken up as an interlayer anion in the layered double hydroxide material.

In a third aspect, the present invention provides a groundwater remediation method for treating acidic or alkaline groundwater containing divalent and trivalent metal cations including the steps of placing a solid alkaline material into one or more regions where the solid alkaline material contacts the groundwater and also placing into the one or more regions a component containing a moiety that is incorporated into a layered double hydroxide material, wherein when the groundwater contacts the solid alkaline material in the one or more regions, layered double hydroxide material is formed, which layered double hydroxide material incorporates the moiety.

In the second and third aspects of the present invention, the component may be placed in the one or more regions before or after the solid alkaline material is placed in the region(s) or, more preferably, at the same time at the solid alkaline material is placed in the one or more regions. In the second and third aspects of the present invention, the solid alkaline material may be placed in the one or more regions by any suitable method or means. Injection in the form of a slurry is preferred. The injection may occur as a mixed series of reagents or in a designated order to yield a desirable solution chemistry for the formation of a particular type or types of layered double hydroxide.

In another aspect, the present invention provides a groundwater remediation method for treating acidic or alkaline groundwater including the steps of placing a solid alkaline material into one or more regions where the solid alkaline material contacts the groundwater, wherein when the groundwater contacts the solid alkaline material in the one or more regions, layered double hydroxide material is formed. In this aspect, the groundwater may nor necessarily contain both divalent and trivalent species. In this case, the material added to the ground will provide the cations necessary to form the LDH material.

In a fourth aspect, the present invention provides a method for stabilizing a volume of waste material containing acidic or alkaline material comprising placing a solid alkaline material into one or more regions where the solid alkaline material contacts the acidic or alkaline material wherein layered double hydroxide material is formed.

The volume of waste material may comprise a waste pile or a waste pit or a waste dam or the like. The waste material, in one embodiment, may comprise red mud arising from the Bayer process.

In a fifth aspect, the present invention provides a method for in situ leaching of an ore body including the steps of supplying an acidic solution to the ore body such that the acidic solution passes through the ore body and dissolves metal values for the ore body, and recovering the acidic solution containing dissolved metal values, the method further including the steps of injecting a slurry of solid alkaline material into one or more regions through which acidic solution can escape from the ore body, whereby divalent and trivalent metal cations in any escaping acidic solution react with the solid alkaline material to form layered double hydroxide material.

In preferred forms of the second aspect, third aspect and fourth aspects of the present invention, the solid alkaline material is magnesia or magnesium hydroxide or mixtures thereof. More preferably, the magnesia is calcined magnesia.

In situ leaching has promised to allow profitable recovery of metals from ore bodies. However, in situ leaching has previously carried significant risk of contaminating ground water by escape of the acidic leaching solution into the groundwater. The fifth aspect of the present invention allows the groundwater to be protected by neutralising any escaping acidic solution and removing deleterious metal ions from the escaping acidic leaching solution. Thus, the method of the fifth aspect of the present invention overcomes many of the environmental concerns surrounding in situ leaching of ore bodies.

The ore body may be a body of ore that is located in the ground. It may be a body of concentrate formed in a heap, it may be a heap of as-mined ore, it may be a heap of crushed or ground ore, it may be a tailings heap, it may be a slag heap. Indeed, it will be appreciated that by "in situ leaching of an ore body," it is meant the large scale leaching of any ore, concentrate, tailings or slag or other metals-value containing material that is positioned on the ground or in the ground during the leaching process. The leachate may also be recovered from a tailings dam or it may be leakage from a tailings dam. In addition the leachate may also be considered to be spillages due to accidents or errors during the recovery or processing or ore-bearing solutions that, or have the potential to, enter the groundwater or have entered (infiltrated) the groundwater via surface contamination.

The slurry of magnesia or magnesium hydroxide may be injected into one or more regions around the ore body, it may be injected into one or more regions under the ore body, it may be injected into one or more regions above the ore body, or it may be injected into or downstream of or upstream of natural aquifers that are in or near the ore body.

The method of the fifth aspect of the present invention may further include injecting one or more further components, as described with reference to the first aspect of the present invention.

The method of the fifth aspect of the present invention is particularly useful for the in situ leaching or heap leaching of uranium containing materials. Uranium has a complex solution chemistry. In general, uranium forms uranium-containing cations at low pH such as the uranyl cation and it forms a range of variably charged anionic species as pH increases. If there is any escape of acidic leaching solution from an in situ leaching operation of a material containing uranium, the uranium species may be taken up within the layered double hydroxide material in two modes—as pH increases, the uptake of $UO_2^{2+}$ in polymeric mixed hydroxide metal layers and/or as pH increases, as a range of variable charged anionic species (e.g. $UO_2(CO_3)_2^{2-}$, $UO_2(CO_3)_3^{4-}$) which occupy the expandable interlayer regions. Thus, the method of the present invention, in resulting in the in situ formation of layered double hydroxide materials in the event of any escape of acidic groundwater, can remove uranium containing cations and uranium containing anions from the groundwater. This is a significant benefit of the present invention.

In some embodiments, the layered double hydroxide material that is formed may include green rust. A general formula for green rust is given in formula (2). Green rust has a structure similar to pyroaurite but with partial substitution of $Fe^{2+}$ by $Mg^{2+}$ in the brucite layer. The formation of green rust reflects in part the use of Mg-containing compounds to neutralize the acidity of the groundwater. The formation of green rust may be especially useful in the treatment of uranium-containing waters or in the leaching of uranium-containing ore bodies. In particular, green rust tends to spontaneously decompose on exposure to oxygen (in air) leading to the formation of more Fe-hydroxide or Fe-oxyhydroxide minerals such as goethite (FeOOH). These secondary oxyhydroxides also have an ability to scavenge U and a range of other anions or cations (e.g. as the uranyl cation or other more complex anions) during formation thus retarding the movement of U if the redox environment of the groundwater changes from reducing to oxidizing during the short-term or over geological time. However, most of the U is scavenged where total carbonate is low (e.g. Hsi and Langmuir, 1985).

Green rust also has the ability to reduce the uranyl cation ($UO_2^{2+}$) to uraninite ($UO_2$), which has many implications to the remediation/retardation of the movement of U in groundwater after neutralization (e.g. Genin et al., 2001, O'Loughlin et al., 2003, Roh et al., 2000). Green rust (as have other layered double hydroxide minerals) also has the ability to exchange anions, some of which have the potential to be reduced to other forms.

In a sixth aspect, the present invention provides a method for management of in situ leaching of an ore body including the steps of supplying an acidic solution to the ore body such that the acidic solution passes through the ore body and dissolves metal values for the ore body, and recovering the acidic solution containing dissolved metal values, the method further including the steps of placing a slurry of solid alkaline material into one or more regions through which acidic solution can escape from the ore body and also placing a component containing one or more buffering anions into the one or more regions, whereby divalent and trivalent metal cations in any escaping acidic solution react with the solid alkaline material to form layered double hydroxide material and the buffering anion is taken up as an interlayer anion in the layered double hydroxide material.

In a seventh aspect, the present invention provides a method for management of in situ leaching of an ore body including the steps of supplying an acidic solution to the ore body such that the acidic solution passes through the ore body and dissolves metal values for the ore body, and recovering the acidic solution containing dissolved metal values, the method further including the steps of placing a slurry of solid alkaline material into one or more regions through which acidic solution can escape from the ore body and also placing a component containing a moiety that is incorporated into a layered double hydroxide material, whereby divalent and trivalent metal ions in any escaping acidic solution react with the solid alkaline material to form a layered double hydroxide material, which layered double hydroxide material incorporates the moiety.

In the sixth and seventh aspects of the present invention, the component may be placed in the one or more regions before or after the solid alkaline material is placed in the region(s) or, more preferably, at the same time as the solid alkaline material is placed in the one or more regions. In the sixth and seventh aspects of the present invention, the solid alkaline material may be placed in the one or more regions by any suitable method or means. Injection in the form of a slurry is preferred.

In preferred embodiments of the sixth and seventh aspects of the present invention, the solid alkaline material is magnesia or magnesium hydroxide or mixtures thereof. More preferably, the magnesia is calcined magnesia. Optionally, one or more other reagents may also be added, in any desired order or variable proportions as required The injection of a slurry of solid alkaline material into one or more regions through or near the ore body such as an abandoned in-situ leaching U mine may also be considered as a rehabilitation method, for example, to rehabilitate an old mine or old leaching site. The rehabilitation method may form part of the decommissioning/closure of a mine or other site. The dosage of a slurry of solid alkaline material into one or more regions through or near the ore body may be based on an estimate of the residual acidity and adding at least a stoichiometric amount of solid alkaline material. The prevailing range(s) of solution chemistry may also be used to estimate the required amount and sequence of addition of magnesia of magnesium hydroxide or mixtures thereof and/or other reagents in any desired order or proportion(s) as required.

The present invention may also be used to protect the ground in the vicinity of pipelines or storage tanks having acidic or alkaline solutions having dissolved divalent or trivalent metal ions from leakage or spillage.

In a further aspect, the present invention provides a method to protect the ground in the vicinity of pipelines or storage tanks having acidic or alkaline solutions having dissolved divalent or trivalent metal ions from leakage or spillage, the method including the step of injecting a slurry or suspension of calcined magnesia or magnesium hydroxide or mixtures thereof and/or other reagents in any desired order or proportion(s) as required into the ground in the vicinity of the pipeline or storage tank such that a leak or spill of the acidic solution causes the leaked or spilled solution to contact the magnesia or magnesium hydroxide and/or other reagents and the divalent and trivalent metal cations react to form a layered double hydroxide material.

In yet a further aspect, the present invention provides a method to protect the ground in the vicinity of pipelines or storage tanks having acidic or alkaline solutions having dissolved divalent or trivalent metal ions from leakage or spillage, the method including the steps of placing a solid alkaline material into one or more regions in the vicinity of the pipeline or storage tank such that that a leak or spill of the acidic or alkaline solution causes the leaked or spilled solution to contact the solid alkaline material and also placing a component containing one or more buffering anions into the one or more regions, wherein whenever the spilled or leaked acidic solution contacts the solid alkaline material in the one or more regions, layered double hydroxide material forms and the buffering anion is taken up as an interlayer anion in the layered double hydroxide material.

In a still further aspect, the present invention provides a method to protect the ground in the vicinity of pipelines or storage tanks having acidic or alkaline solutions having dissolved divalent or trivalent metal ions from leakage or spillage, the method including the steps of placing a solid alkaline material into one or more regions in the vicinity of the pipeline or storage tank such that that a leak or spill of the acidic or alkaline solution causes the leaked or spilled solution to contact the solid alkaline material and also placing into the one or more regions a component containing a moiety that is incorporated into a layered double hydroxide material, wherein whenever the spilled or leaked acidic or alkaline solution contacts the solid alkaline material in the one or more regions, layered double hydroxide material forms, which layered double hydroxide material incorporates the moiety.

The regions in the vicinity of the pipeline or storage tank may be around the pipeline or storage tank, under the pipeline or storage tank or above an underground pipeline or storage tank.

A further advantage of all aspects of the present invention may occur due to changes in the porosity or permeability of an underground aquifer due to cementation of the layered double hydroxide material in the aquifer, which may be useful in not only neutralising the acidic or alkaline plume but also constraining and/or redirecting (laterally and/or vertically) groundwater flow.

In the first and fourth aspects of the present invention, the slurry of magnesia or magnesium hydroxide or mixtures thereof and/or other reagents in any desired order or proportion(s) as required may be injected to form a virtual curtain that may have a vertical structure and/or a horizontal structure. In forming a virtual curtain having a vertical structure, the magnesia or magnesium hydroxide or mixtures thereof and/or other reagents in any desired order or proportion(s) as required may be delivered via pumping of a colloidal suspension and/or solution in a well-field type arrangement within or ahead of an acidic plume. In cases where the virtual curtain of magnesia or magnesium hydroxide or mixtures thereof and/or other reagents in any desired order or proportion(s) as required forms a horizontal structure, the magnesia or magnesium hydroxide may be injected, for example, into a permeable strata underlying for example, a heap leaching operation or alternatively an artificially constructed permeable strata below the heap leaching operation.

In some embodiments of the present invention, layered double hydroxide materials may form and there is a possibility that other phases which may also be useful may also be formed as the pH increases during neutralization. Ideally, however, the reaction of the groundwater with the magnesia or magnesium hydroxide is sufficiently rapid that layered double hydroxides are the predominant mineral phase formed. For example, aluminium-silica phases such as allophane and imogolites may be formed. These materials are known to have an ion exchange properties at low to intermediate pH and cation exchange properties at higher pH, or zeolitic phases. In addition, oxide, hydroxide or oxyhydroxide phases containing one or more of Fe, Al, and Si may be formed. These materials may be able to incorporate metals and/or anions into their structure and/or absorb metals and/or anions to their external or internal surfaces, depending on pH. Any or all of the above materials may augment the function of the layered double hydroxide materials in remediating the groundwater. Indeed, in some embodiments, green rust is formed. This material can decompose when exposed to oxidising conditions to form Fe-hydroxide and Fe-oxyhydroxide minerals which can scavenge a range of anions and cations and also reduce cations to forms that are more easily removed from the water. In addition, as a relatively strong reductant, green rusts have the potential to reduce a suite of environmental pollutants such as nitrate, selenate, chromate, pertechnate and uranyl ions and some organic compounds (e.g. Hansen, 2004), many of which are often present together.

In all aspects of the present invention, it is possible that repeated additions of the alkaline material may be made. Additional alkaline material may be made at regular intervals or in response to monitoring of groundwater revealing an increase in acidity. The alkaline material may comprise magnesia of magnesium hydroxide or mixtures thereof and/or other reagents in any desired order or proportion(s) as required.

In all aspects of the present invention, further additives may be added with, prior, or after the solid alkaline material. For example, where a slurry is injected into the ground, the slurry may include suspending agents or viscosity modifying agents or rheology modifying agents. Surfactants and other organic compounds may also be added to assist in wetting and penetration in the ground or to facilitate the formation of a micelle or emulsion to transport and/or modify the reactivity the magnesia or magnesium hydroxide. Other agents, such as silicate and aluminate, may also be added.

In all aspects of the present invention, the method may further include the step of conducting a pre-treatment to facilitate the formation of a desired or pre-determined layered double hydroxide material. For example, where the site being treated has insufficient levels of Al-cations for hydrotalcite formation, the site may be treated to increase the level of Al-cations in the soil or groundwater to promote the formation of hydrotalcite as the predominant layered double hydroxide.

For example, an additional type of (pre-) amendment may involve the pre-injection of Al as an acidified solution to yield a desired range of trivalent cation ratios (Al/(Al+Fe)) expressed as mole fractions ranging from that present in the groundwater up to mole ratios of Al/(Al+Fe) of e.g. >0.9. On this basis, a specific type of layered double hydroxide mineral may be formed such as hydrotalcite which will be more resistant to changes in the redox geochemistry of the groundwater. Similarly a combination of reagents such as for example calcined magnesia and sodium aluminate may be added simultaneously. Other pretreatments will also be apparent.

The desired pre-treatment may be determined by analyzing the groundwater, determining a layered double hydroxide material to be formed and adjusting the cations and/or (oxy) anions present in the groundwater to achieve formation of the desired layered double hydroxide material by positioning a material containing a species that forms the cations into the groundwater or into site(s) near the groundwater or through which the groundwater flows. The material containing a species that forms the cations is preferably a solution containing the cations. The solution is suitably injected into the ground or into a designated structure such as a waste dump or waste stream. It will be appreciated that the desired layered double hydroxide material will not necessarily be the only layered double hydroxide material to be formed.

EXAMPLES

Example 1

The construction of a virtual curtain involves the injection into the aquifer of magnesium hydroxide and other reagents as required as a slurry either into or down gradient of the acidic groundwater plume. The acidic groundwater plume might typically be derived from industrial processes or oxidation of acid-sulphate soils. The aim is to neutralise the acidity and produce a post-treatment shallow groundwater solute with pH in the range ca 8-10 which would be compatible with the prevailing pH and major ion composition in many natural waters or groundwaters.

The construction of a virtual curtain is attractive in that there is minimal surface expression of the remediation activity, and given a good knowledge of the local hydrology, a range of scales could conceivably be targeted and dosed according to their acidic-neutralisation requirements. In addition, given the buffering effect on the reactivity of magnesium hydroxide at alkaline pH, additional neutralisation capacity could remain in situ in the event of additional acidity being generated either locally (eg. from industrial processes) or being transported from elsewhere. The expected secondary mineralogy to be formed in the aquifer, namely, layered double hydroxide minerals, are expected to be highly stable. In addition, layered double hydroxide minerals also have the capacity to complex potentially problematic anions (eg. As, P) via internal ion-exchange. The layered double hydroxide minerals may also be further stabilised by Si— and/or Al— exchange to form a precursor to an aluminosilicate clay mineral. The layered double hydroxide may also be made more stable to further acidity or changes in redox potential by the addition of other anions such as carbonate and permanganate respectively. Rapid reaction of the acidic groundwater with the injected slurry of magnesia or magnesium hydroxide could be achieved by for example high pressure injection at multiple sites, such as in a well field type design. This style of delivery would seek to ensure the most rapid possible delivery and neutralization of the groundwater. The rapid injection of magnesia or magnesium hydroxide is preferred to enhance the rate of formation of layered double hydroxides relative to other secondary minerals which might normally predominate during a relatively slow natural attenuation process.

Example 2

Modelling of the addition of magnesium hydroxide (brucite—$Mg(OH)_2$) to a theoretical groundwater of pH 2.5 was undertaken using PHREEQC (Parkhurst, 1995) to monitor the consequent changes in the groundwater geochemistry. Two hydrotalcite phases were chosen: an Mg—Al composition and an Mg—Fe composition. These two hydrotalcite compositions can be considered as end members of a solid solution mixing series. A known excess (ca two times) of the required brucite was added to the theoretical groundwater based on the total trivalent cation ($Al^{3+}+Fe^{3+}$) concentration and assuming a divalent ($Mg^2+$) to trivalent ($Al^{3+}$ or $Fe^{3+}$) molar ratio in the hydrotalcite of 3:1. The equilibrium phases that were selected for the reaction were alunite and jurbanite for Al and K-jarosite and ferrihydrite for Fe as these mineral phases typically control Al and Fe solubility respectively for a variety of groundwaters. Brucite was also considered to be an equilibrium phase as its dissolution is pH-dependant and it behaves as a pH (ca. 9.0-9.5) buffer. The brucite was added to the theoretical groundwater in 25 identical increments.

After the incremental addition of brucite there is a consistent increase in brucite saturation. In the final six additions the brucite buffers the system to a final pH of ca. 9.1. As pH increases, jurbanite changes from oversaturation to undersaturation, while alunite changes from being in equilibrium with the solution between pH ca. 3-4.5, to undersaturation outside this pH range. All other minerals that previously controlled solubility in the original groundwater maintain a degree of undersaturation. Hydrotalcites, which become equilibrated with the solution above pH ca. 4 for the Mg—Al hydrotalcite and pH ca. 5.5 for the Mg—Fe hydrotalcite phases respectively, remain in equilibrium with the solution up to at a pH of at least 9.1 where the solution pH remains buffered by brucite dissolution.

Above pH ca. 4.5 and pH ca. 5.5 respectively there is a steep decline in the soluble Al and then Fe concentrations to below detection limits due to incorporation into the hydrotalcite. As hydrotalcites are stable at high pH both the Al and Fe, in addition to the added Mg, would be likely to remain strongly bound within the layered double hydroxide (LDH) structure. This retention may conceivably be enhanced by the ion-exchange of strong (oxy)anions such as those of but not limited to P, As or Si.

Example 3

In-situ leaching of an orebody with acid may have been terminated on economic (cost-benefit) and/or environmental grounds and it is now necessary to remediate/rehabilitate the acidic groundwater plume. Remediation may involve direct injection of a slurry of calcined magnesia or magnesium hydroxide and other reagents as required directly into the acidic groundwater plume at one or more sites (and/or outside the orebody if there has been significant migration of the groundwater plume).

In addition, to further limit offsite migration, for instance to protect an ecologically sensitive wetland which is intersected and sustained by shallow groundwaters a virtual curtain may be constructed as described in Example 1 (above). The use of the techniques described here may conceivably complement other rehabilitation.

Example 4

A simulated groundwater prepared in the laboratory containing 1500 ppm $Fe^{3+}$, 500 ppm $Fe^{2+}$, 200 ppm $Al^{3+}$ and 2700 ppm $SO_4^{2-}$ and adjusted to pH 2 was treated by contacting with an excess of calcined magnesia. Ninety-nine percent of the $Fe^{3+}$ and $Al^{3+}$ was removed, as was a range of transition metal ions. Initial tests have also shown that a range of anions was also reduced in concentration in the water. Further, the present inventor found that green rust was formed as the major component of the layered double hydroxide material formed in this example. To the best knowledge of the inventor, this is the first time that green rust has been formed without the presence of carbonate or bicarbonate salts, instead using calcined magnesia to adjust the pH. Thus, carbonate or bicarbonate does not form the predominant interlayer anion of the green rust but rather sulphate anion is the major interlayer anion. Sulphate is in general more readily exchanged than carbonate and thus it is expected that the "sulphate form" of the green rust will be able to more effectively remove deleterious anions than the carbonate form. If the method of the present invention is used in applications that may involve uranium-containing ions, uranium ions complexed by carbonate (e.g. $[UO_2(CO_3)_2]^{2-}$) are more mobile at higher pH, so formation of green rust (or other layered double hydroxides that may be tailored for a specific application) without carbonate anions (or with low levels of carbonate anions) is advantageous in that less mobile uranium-containing ions will result, resulting in the potential for migration of uranium species to be more restricted.

Example 5

A mineral waste processing residue such as that formed during the Bayer process to extract alumina from bauxite may require geochemical and structural stabilization and remediation. This mineral waste processing residue commonly termed "red mud" is highly alkaline and contains abundant dissolved Al-species. Injection of calcined magnesia and/or magnesium hydroxide and other reagents as required into the red mud has the potential to reduce alkalinity and pH, reduce the mobility of Al and increase the geotechnical stability of the waste residue via the in-situ formation of layered double hydroxides, for example, hydrotalcites as an interstitial or structural cement.

Those skilled in the art will appreciate that the present invention may be subject to variations and modifications other than those specifically described. It is to be understood that the present invention encompasses all such variations and modifications that fall within its spirit and scope.

REFERENCES

Albiston, L., Franklin, K. R., Lee, E. and Smeulders, J. B. A. F., (1996). Rheology and microstructure of aqueous layered double hydroxide dispersions. *J. Mater. Chem.*, 6, 871-877.

Amin, S. and Jayson, G. G., (1996). Humic substance uptake by hydrotalcites and PILCS. *Wat. Res.*, 30, 299-306.

ANZECC/NHMRC (1992). Australian and New Zealand Guidelines for the Assessment and Management of Contaminated Sites. Australian and New Zealand Environment and Conservation Council and National Health and Medical Research Council.

Boclair, J. W and Braterman, P. S., (1999). Layered double hydroxide stability. 1. Relative stabilities of layered double hydroxides and their simple counterparts. *Chem. Mater.* 11, 298-302.

Bourrie, G., Trolard, F., Refait, P. and Feder, F., (2002). A solid solution model for $Fe^{II}$—$Fe^{III}$—Mg green rust (fougerite): structural and geochemical constraints. 17$^{th}$ WCSS, 14-17 Aug., 2002, Thailand, Paper no. 1653, 19 pp.

Cavani, F., Trifiro, F and Vaccari, A., (1991). Hydrotalcite-type anionic clays: preparation, properties and applications. *Catalysis Today*, 11, 173-301.

Cortina, J., Lagreca, I., De Pablo, J., (2003). Passive in situ remediation of metal-polluted water with caustic magnesia-evidence from column experiments. *Environ. Sci. Technol.* 2003, 37, 1971-1977.

Depege, C., El Metoui, F.-Z., Forano, C., de Roy, A., Dupuis, J. and Besse, J-P., (1996). Polymerization of silicates in layered double hydroxides. *Chem. Mater.*, 8, 952-960.

Feitknecht, W von, (1942). Uber die Bildung von Doppelhydroxen zwischewn zwei- und dreiwertigen Metallen. *Helv. Chim. Acta.*, 25, 555-569.

Ford, R. G., Scheinost, A. C, Schekel, K. G. and Sparks, D. L., (1999) The link between clay mineral weathering and the stabilization of Ni surface precipitates. *Environ. Sci. Technol.*, 33, 3140-3144.

Frondel, C., (1941). Constitution and polymorphism of the pyrauritic and sjogrenite groups. *Amer. Mineral.*, 26, 295-306.

Genin, J.-M. R., Refait, P., Bourrie, G., Abdelmoula, M. and Trolard, F., (2001). Structure and stability of the Fe(II)-Fe(III) green rust "fougerite" mineral and its potential for reducing pollutants in soil solutions. *Appl Geochem.*, 16, 559-570.

Hansen, H. C. B., (2004). Green rusts and reduction of pollutants. In: Biogeochimie du cycle du fer Rouilles vertes et fougerite. Institute de France, Academie des Sciences, 10 Dec., 2004.

Hsi, C. K. D. and Langmuir, D. (1985). Adsorption of uranyl onto ferric oxyhydroxides: Application of surface complexation site binding model. *Geochim. et Cosmochim. Acta*, 49, 2423-2432.

Kameda, T., Yabuuchi, F., Yoshioka, T., Uchida, M. and Okuwaki, A., (2003). New method of treating dilute mineral acids using magnesium-aluminum oxide. *Wat. Res.*, 37, 1545-1550.

Misra, C. and Perrotta, A. J., (1992). Composition and properties of synthetic hydrotalcites. *Clay and Clay Min.*, 40, 145-150.

Miyata, S., (1980). Physico-chemical properties of synthetic hydrotalcites in relation to composition. *Clay and Clay Min.*, 28, 50-56.

Miyata, S., (1983). Anion-exchange properties of hydrotalcite-like compounds. *Clay and Clay Min.,* 31, 305-311.

O'Loughlin, E. J., Kelly, S. D., Cook, R. E., Csencsits, R. and Kemner, K. M., (2003). Reduction of uranium (VI) by mixed Fe(II)/Fe(III) hydroxide (Green rust): Formation of $UO_2$ nanoparticles. *Environ. Sci. Technol.,* 37, 721-727.

Oobuku, A., Ooi, K. and Hayashi, H., (1993). Preparation and phosphate ion-exchange properties of a hydrotalcite-like compound. *Langmuir,* 9, 1418-1422.

Parkhurst, D. L., (1995). Users guide to PHREEQC—A computer program for speciation, reaction-path, advective transport, and inverse geochemical calculations. Wat. Res. Investigation Rpt. 95-4277, USGS Reardon, E. J. and Della Valle, S., (1997), Anion sequestering by the formation of anionic clays: lime treatment of fly ash slurries. *Environ. Sci. Technol.,* 31, 1218-1223.

Roh, Y., Lee, S. Y., Elles, M. P. Foss, J. E., (2000). Incorporation of radioactive contaminants into pyroaurite-like phases by electrochemical synthesis. *Clay and Clay Miner.,* 48, 266-271.

Sato, T., Wakabayashi, T. and Shimada, M., (1986). Adsorption of various anions by magnesium aluminium oxide. Ind. Eng. Chem. Prod. Res., 25, 89-92.

Seida, Y. and Nakano, Y., (2000). Removal of humic substances by layered double hydroxide containing iron. *Wat. Res.,* 34, 1487-1494.

Seida, Y. and Nakano, Y., (2002). Removal of phosphate by layered double hydroxides containing iron. *Wat. Res.,* 36, 1306-1312.

Shin, H-S., Kim, M-J., Nam, S-Y. and Moon, H-C., (1996). Phosphorus removal by hydrotalcite compounds (HTLcs). Wat. Sci. Tech., 34, 161-168.

Taylor, R. M. (1984). The rapid formation of crystalline double hydroxy salts and other compounds by controlled hydrolysis. *Clay Min.,* 19, 591-603.

Taylor, R. M. and McKenzie, R. M., (1980). The influence of aluminium and iron oxides VI. The formation of Fe(II)-Al (III) hydroxy-chlorides, -sulphates, and -carbonates as new members of the pyroaurite group and their significance in soils. *Clay and Clay Min.* 28, 179-187.

Thornber, M. R. and Hughes, C. A., (1987). The mineralogical and chemical properties of red mud waste from the Western Australian alumina industry. In Wagh, A. S. and Desai, P (Ed.), *Proc. Int. Conf. Bauxite Tailings,* Kingston, Jamaica. 1-19.

Vucelic, M., Jones, W. and Moggridge, G. D., (1997). Cation ordering in synthetic layered double hydroxides. *Clays and Clay Min.,* 45, 803-813.

The invention claimed is:

1. A groundwater remediation method for treating acidic or alkaline groundwater containing divalent or trivalent metal cations, the method including the step of injecting a slurry or suspension of solid alkaline material into the ground, said slurry or suspension being injected into one or more regions such that the groundwater contacts the solid alkaline material and the divalent and trivalent metal cations react to form a layered double hydroxide (LDH) material comprising hydrotalcite.

2. A groundwater remediation method as claimed in claim 1 wherein the solid alkaline material is selected from lime, calcium hydroxide, magnesia or magnesium hydroxide or a combination of two or more of the above.

3. A groundwater remediation method as claimed in claim 1 wherein the slurry or suspension is injected by using pumping or by creating a local head from a reservoir located above a point of injection.

4. A groundwater remediation method as claimed in claim 1 wherein an overdose of slurry or suspension is used in excess to that required for neutralization of acidity and/or formation of a layered double hydroxide.

5. A groundwater remediation method as claimed in claim 1 further comprising repeated or periodic injections of the slurry or suspension.

6. A groundwater remediation method as claimed in claim 1 further comprising injecting a further component, the further component being a component containing buffering anions.

7. A groundwater remediation method as claimed in claim 1 further comprising injecting a further component, the further component being a component containing one or more moieties that takes place in the reaction to form the layered double hydroxide material, with the one or more moieties being incorporated into a matrix or crystal structure of the layered double hydroxide material.

8. A groundwater remediation method as claimed in claim 1 further comprising injecting a further component, the further component including nitrate anions or sulphate anions where sulphate reduction constitutes a concurrent or additional remediation step or phosphate ions.

9. A groundwater remediation method as claimed in claim 1 further comprising injecting a further component, the further component being injected prior to injection of the solid alkaline material or injected with the slurry or suspension of the solid alkaline material, or injected after injection of the solid alkaline material.

10. A groundwater remediation method for treating acidic or alkaline groundwater containing divalent and trivalent metal cations including the steps of placing a solid alkaline material into one or more regions where the solid alkaline material contacts the groundwater and also placing a component containing one or more buffering anions into the one or more regions, wherein whenever the groundwater contacts the solid alkaline material in one or more regions, layered double hydroxide material forms and the the one or more buffering anions are taken up as interlayer anions in the layered double hydroxide material, said layered double hydroxide material comprising hydrotalcite.

11. A groundwater remediation method for treating acidic or alkaline groundwater containing divalent and trivalent metal cations including the steps of placing a solid alkaline material into one or more regions where the solid alkaline material contacts the groundwater and also placing into the one or more regions a component containing a moiety that is incorporated into a layered double hydroxide material, wherein when the groundwater contacts the solid alkaline material in the one or more regions, layered double hydroxide material is formed, which layered double hydroxide material incorporates the moiety, said layered double hydroxide material comprising hydrotalcite.

12. A groundwater remediation method for treating acidic or alkaline groundwater including the steps of placing a solid alkaline material into one or more regions where the solid alkaline material contacts the groundwater, where when the groundwater contacts the solid alkaline material in the one or more regions, layered double hydroxide material is formed, said layered double hydroxide material comprising hydrotalcite.

13. A method for stabilizing or remediating a volume of waste material containing acidic or alkaline material comprising placing a solid alkaline material into one or more regions where the solid alkaline material contacts the acidic or alkaline material wherein layered double hydroxide material is formed, said layered double hydroxide material comprising hydrotalcite.

14. A method as claimed in claim 13 wherein the volume of waste material comprises a waste pile or a waste pit or a waste dam.

15. A method as claimed in claim 13 wherein the volume of waste material comprises red mud arising from the Bayer process.

16. A method for remediation of an in situ leaching of an ore body including the steps of supplying an acidic solution to the ore body such that the acidic solution passes through the ore body and dissolves metal values for the ore body, and recovering the acidic solution containing dissolved metal values, the method further including the steps of injecting a slurry of solid alkaline material into one or more regions through which acidic solution can escape from the ore body, whereby divalent and trivalent metal cations in any escaping acidic solution react with the solid alkaline material to form layered double hydroxide material, said layered double hydroxide material comprising hydrotalcite.

17. A method as claimed in claim 16 where the ore body comprises a body of ore that is located in the ground or a body of concentrate formed in a heap, a heap of as-mined ore, a heap of crushed or ground ore, a tailings heap, or a slag heap.

18. A method as claimed in claim 16 where the method is used for the in situ leaching or heap leaching of uranium containing materials.

19. The ground water remediation method of claim 1, wherein the layered double hydroxide (LDH) material predominantly comprises hydrotalcite.

* * * * *